Patented July 31, 1945

2,380,551

UNITED STATES PATENT OFFICE 2,380,551

POLYMERIZATION IN AQUEOUS EMULSION

Waldo L. Semon, Silver Lake, Ohio, assignor to The B. F. Goodrich Company, New York, N. Y., a corporation of New York No Drawing. Application March 27, 1941, Serial No. 385,495

3 Claims. (Cl. 260—84.5)

This invention relates to the polymerization of unsaturated organic compounds in aqueous emulsion, and particularly to a material from which the vessels in which such polymerizations are performed may advantageously be constructed.

It is known that the vessel in which polymerizations in aqueous emulsion are conducted may profoundly affect the course of the polymerization and the type of polymer obtained. When polymerizations are conducted in vessels made of many materials, there is formed a deposit of polymer on the walls of the vessel which reduces the heat-conductivity of the vessel and the yield of the desired type of product. Other materials from which polymerizers might be constructed strongly inhibit polymerization reactions. It has further been found that certain metals which do not ordinarily adversely affect emulsion polymerizations cannot be employed after they are welded. The difficulties coupled with the corrosion problems accompanying polymerizations in aqueous emulsions have made the selection of materials of construction for polymerizers very difficult. Despite its fragility and poor heat-conductivity, glass has been the material ordinarily selected for this purpose.

I have discovered that an alloy containing 80% to 70% by weight of nickel, 15% to 20% of chromium, and 5% to 10% of iron, is an excellent material of construction for polymerizers. This alloy does not inhibit emulsion polymerization and it does not promote the formation of polymers upon its surface. Furthermore, this alloy may be welded and subjected to other heat treatments without adversely affecting its desirable properties.

The method of this invention comprises polymerizing an unsaturated organic compound emulsified in water in a vessel in which the surfaces in contact with the emulsion are made of an alloy containing nickel, chromium, and iron in the above-mentioned proportion. While the whole vessel may be made of such an alloy if desired, a vessel constructed of iron or other comparatively inexpensive metal lined with the alloy is less expensive and equally satisfactory insofar as the effect of the vessel upon the polymerization is concerned.

In an experiment designed to determine the effect of an alloy containing about 74% of nickel, 18% of chromium, and 8% of iron upon emulsion polymerization, 75 parts of butadiene and 25 parts of acrylonitrile were copolymerized in an aqueous emulsion in a glass vessel containing a strip of the alloy. After five polymerizations, there were several spots of polymer on the glass, but none on the metal. The latices formed by the polymerizations were coagulated to form high quality synthetic rubbers which, when vulcanized, had tensile strengths of 4000–5000 lbs./in.$^2$ and elongations of 550–700%. Welding the alloy did not affect its behavior in the emulsion polymerization.

When the experiment was repeated employing a piece of nickel instead of the alloy, a coating of adherent polymer began to form on the metal during the second polymerization, and after the fourth polymerization there was a thick coating of adherent polymer on the metal.

In other polymerizations in which a vessel constructed of an alloy containing about 74% of nickel, 18% of chromium, and 8% of iron was employed, there was very little adherent polymer formed, and high quality synthetic rubbers were produced.

Polymerizations may be performed in vessels made of or lined with an alloy containing 80% to 70% of nickel, 15% to 20% of chromium and 5% to 10% of iron in an acid, neutral or alkaline emulsion. If it is desired to effect the polymerization in an acid medium, salts of hymolal bases such as the hydrochloride of diethylaminoethyloleylamide, trimethylcetylammonium methyl sulfate, etc., are ordinarily employed as emulsifying agents, while fatty acid soaps such as sodium oleate, sodium stearate, and sodium palmitate are employed to form alkaline emulsions. Hymolal sulfates and aryl sulfonates such as sodium lauryl sulfate, sodium isopropyl napthalene sulfonate, etc., may be employed to form emulsions in a pH range of from ten or over to three or less.

The polymerization of any unsaturated organic compound in aqueous emulsion may be advantageously effected in the presence of an alloy of the composition herein defined. As examples may be mentioned the polymerization in aqueous emulsion of vinyl halides such as vinyl chloride, vinyl esters such as vinyl acetate, acrylic esters such as methyl methacrylate, olefines such as isobutylene, styrene, and vinyl naphthalene, conjugated dienes such as butadiene, isoprene, chloroprene, and 2,3-dimethylbutadiene, and the co-polymerization of two or more unsaturated organic compounds such as vinylchloride and vinylacetate, butadiene and acrylonitrile, butadiene and methyl methacrylate, butadiene and styrene, etc.

It is within the scope of the invention to employ any of the catalysts, initiators, activators, modifiers or other materials which have been elsewhere described as being useful in emulsion polymerizations and which will not be specifically mentioned herein since their use forms no part of the invention.

I claim:

1. The method which comprises polymerizing butadiene in aqueous emulsion in a vessel in which the surfaces contacting the emulsion during the polymerization are constructed of an alloy containing 80% to 70% of nickel, 15% to 20% of chromium, and 5% to 10% of iron.

2. The method which comprises copolymerizing butadiene and acrylonitrile in aqueous emulsion in a vessel in which the surfaces contacting the emulsion during the polymerization are constructed of an alloy containing 80% to 70% of nickel, 15% to 20% of chromium, and 5% to 10% of iron.

3. The method which comprises copolymerizing butadiene and acrylonitrile in aqueous emulsion in a vessel in which the surfaces contacting the emulsion during the polymerization are constructed of an alloy containing about 74% of nickel, 18% of chromium, and 8% of iron.

WALDO L. SEMON.